(12) United States Patent
Yamashita

(10) Patent No.: US 6,715,664 B2
(45) Date of Patent: Apr. 6, 2004

(54) FRICTION STIR WELDING METHOD

(75) Inventor: Seiichiro Yamashita, Kobe (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 10/304,545

(22) Filed: Nov. 25, 2002

(65) Prior Publication Data

US 2003/0098336 A1 May 29, 2003

(30) Foreign Application Priority Data

Nov. 27, 2001 (JP) .......................... 2001-360682

(51) Int. Cl.⁷ .......................... B23K 31/02; B23K 20/12
(52) U.S. Cl. ........................ 228/112.1; 228/2.1
(58) Field of Search .............. 228/112.1, 2.1

(56) References Cited

U.S. PATENT DOCUMENTS

| | | | | |
|---|---|---|---|---|
| 6,051,325 A | * | 4/2000 | Talwar et al. ............... | 428/593 |
| 6,230,957 B1 | * | 5/2001 | Arbegast et al. ........ | 228/112.1 |
| 6,530,513 B2 | * | 3/2003 | Ezumi et al. .............. | 228/112.1 |
| 2002/0190103 A1 | * | 12/2002 | Yoshinaga ................ | 228/112.1 |
| 2003/0098335 | * | 5/2003 | Saeki et al. ............... | 228/112.1 |

FOREIGN PATENT DOCUMENTS

JP 2000-343250 12/2000

* cited by examiner

*Primary Examiner*—L. Edmondson
(74) *Attorney, Agent, or Firm*—Kolisch Hartwell PC

(57) ABSTRACT

Disclosed is a friction stir welding method of welding a butted portion of work pieces relatively easily and firmly with an improved finish after the butted portion is tack-welded. In the method, a plurality of work pieces are placed to be butted, a plurality of V-shaped grooves are intermittently formed along the butted portion, each of the grooves is tack-welded by using a welding material by TIG welding or MIG welding, deposits in the tack-welded sections are cut and removed so as to be substantially coplanar with a surface of the work pieces, and then friction stir welding is continuously performed over the entire length of the butted portion, and thus, the work pieces are joined.

4 Claims, 5 Drawing Sheets

FRICTION STIR WELDING METHOD

BACKGROUND OF THE INVENTION

1. Field of the Invention

The present invention relates to a method of welding a plurality of work pieces by friction stir welding. More particularly, the present invention relates to a welding method optimal to the welding of members constituting a structural body of a railway vehicle in manufacturing.

2. Description of the Related Art

For example, in manufacturing a structural body of a railway vehicle, structures constituting the vehicle body are formed by friction stir welding of a plurality of extruded sections. The extruded sections are arranged such that their longitudinal direction corresponds with the longitudinal direction of the vehicle body and their width conforms to the longitudinal periphery of the vehicle body.

In general, in the friction stir welding of the work pieces such as the extruded sections, the work pieces are placed to be butted along the longitudinal direction and the butted portion of the work pieces is welded after being tack-welded at even intervals. Here, the friction stir welding is continuously performed over the entire length of the butted portion including the tack-welded sections.

The friction stir welding method is a solid phase welding method in which a rotating tool comprising a pin of a round bar shape to be inserted into the portion to be welded is rotated and moved along a joining line to cause the temperature of the portion to be welded to be increased by friction heat and the portion to be welded to thereby flow plastically. The work pieces which go through the friction stir welding are comprised of members made of metal such as aluminum alloy suitable for friction stir welding.

In addition to the above, Japanese Laid-Open Patent Application Publication No. 2000-343250 discloses a method of manufacturing structures as a prior art relating to this type of friction stir welding method. In this method, the portion to be welded is tack-welded at intervals over I-shaped grooves (instead of V-shaped grooves) and the friction stir welding is performed in the portions other than the tack-welded sections.

However, the conventional friction stir welding methods suffer from disadvantages described below.

(1) For example, in the former method, while the friction stir welding is performed over the entire length of the butted portion including the tack-welded sections, this is not sufficiently performed because the pin of the rotating tool for friction stir welding is not inserted into the butted portion under the tack-welded sections to a sufficient depth.

More specifically, the rotating tool is configured such that a small-diameter pin to be inserted into the butted portion is provided coaxially with a large-diameter portion located outwardly of the butted portion. Therefore, in the friction stir welding, a step portion (also referred to as a shoulder portion) between the pin and the large-diameter portion is inserted slightly into the butted portion, in which state, the rotating tool rotates while being inclined to the opposite direction to the movement of the rotating tool along the butted portion. The tack-welded sections are called "deposits" with a welding material raised above the surface of the work pieces at the butted portion. In these tack-welded sections, the rotating tool rotates in the state in which the above step portion is somewhat up onto each of the tack-welded sections. Since the pin is not inserted into the butted portion to a sufficient depth, the friction stir welding is not performed to a sufficient depth, thereby resulting in insufficient welding strength. In addition, since the pin is inserted into and cuts the tack-welded sections, a gap between the work pieces is created or the work pieces are displaced from each other, so that relative positions of the work pieces are changed.

(2) In the latter method, the friction stir welding is not performed in the tack-welded sections and, therefore, the resulting welding strength is weaker than the welding strength obtained by the former method. Besides, since it is necessary to upwardly move the rotating tool before each of the tack-welded sections and then downwardly move the rotating tool after passing by each of them during the friction stir welding, the operation of the rotating tool becomes complex, which leads to increased work time. Further, when automatically moving the rotating tool upwardly and downwardly, sometimes some portions in front of and behind the tack-welded sections are left unwelded, so that the welding strength becomes much weaker.

In the above-mentioned conventional methods, since the tack-welded sections are left as being raised above the surface of the work pieces, such raised deposits need to be removed by cutting after the friction stir welding.

SUMMARY OF THE INVENTION

The present invention addresses the above-described condition, and an object of the present invention is to provide a friction stir welding method capable of welding a butted portion relatively easily and firmly after the butted portion is tack-welded and offering improved finish without a need for removal of deposits after the friction stir welding.

To achieve the above-described object, there is provided a friction stir welding method in which a plurality of work pieces are placed to be butted, a plurality of V-shaped grooves are intermittently formed along a butted portion of the plurality of work pieces, each of the V-shaped grooves is tack-welded by using a welding material, deposits in the tack-welded sections are cut and removed so as to be substantially coplanar with a surface of the plurality of work pieces, and then the friction stir welding is continuously performed over the entire length of the butted portion. In this manner, the friction stir welding is performed in the work pieces.

In accordance with the friction stir welding method of the present invention having the above constitution, since the tack welding is performed by the welding material being melted in the V-shaped grooves formed between the work pieces, the welding strength at the tack-welded sections is increased and the tack-welding strength is increased in contrast with the tack welding in which deposit welding is performed on a surface of the work pieces. A portion of the tack-welded sections raised above the surface of the work pieces is cut and removed so as to be substantially coplanar over the entire length of the butted portion without deposits at the welded portion between the work pieces, and in this state, the friction stir welding is performed by using a dedicated rotating tool. With this method, the friction stir welding is continuously performed without moving upwardly and downwardly the rotating tool over the entire length of the butted portion including the tack-welded sections, which facilitates welding work and increases work efficiency.

In particular, since the surface of the cut tack-welded sections is substantially coplanar with the other butted portion between the work pieces, the pin of the rotating tool is easily inserted into the butted portion to a sufficient depth and rotated. So, plastic flow occurs sufficiently from front surfaces of the work pieces to a vicinity of their rear surfaces, and solid phase welding is performed there. Consequently, high welding strength is obtained. While the pin of the rotating tool is inserted into the tack-welded sections to a sufficient depth, the welded portions provided in the V-shaped grooves are not cut in contrast with the conventional deposit welding. Further, in the tack-welded sections, base metal of the work pieces, together with the welding material being melted and solidified in the V-shaped grooves, is caused to flow plastically and to be solid-phase welded. Consequently, the friction stir welding is performed over the entire length of the butted portion including the tack-welded sections. Further, since the butted portion of the work pieces is configured to be substantially coplanar over the entire length, finish is unnecessary after the friction stir welding.

In the present invention, for example, the tack-welding may be performed at intervals of approximately 400 mm to 700 mm. By setting the intervals of the tack welding of the butted portion to approximately 400 mm to 700 mm for the work pieces as long as or longer than, for example, approximately 2000 mm to 3000 mm, the butted portion is not separated even when the deposits in the tack-welded sections are cut. Preferably, the depth of the V-shaped grooves is set to approximately 30 mm.

In the present invention, the deposits in the tack-welded sections may be cut and removed by using a grinding stone or a blade. By using the grinding stone or the blade, the cutting and removal can be performed relatively easily and in a short time, and the finish, after cutting and removal, is improved.

In the present invention, the tack welding may be performed by MIG welding or TIG welding. In this case, metal having strength almost as high as that of the base metal of the work pieces is preferably used as the welding material. With this configuration, when the melted welding material is solidified, the butted state of the work pieces can be reliably maintained, because the base metal of the taper faces of the V-shaped grooves is well mixed with the welding metal of the welded portion and the width of the taper face of the V-shaped grooves is large. In addition, during the friction stir welding, the rotating tool (pin) causes the base metal of the work pieces as well as the welded portion to flow plastically, and both of the materials are substantially uniformly mixed and solid-phase welded. Consequently, high welding strength can be obtained in the tack-welded sections as well as in the other butted portion.

The above and further objects and features of the invention will more fully be apparent from the following detailed description with accompanying drawings.

DETAILED DESCRIPTION OF THE PREFERRED EMBODIMENTS

Hereinafter, an embodiment of the present invention will be described with reference to the accompanying drawings.

Figure 1:
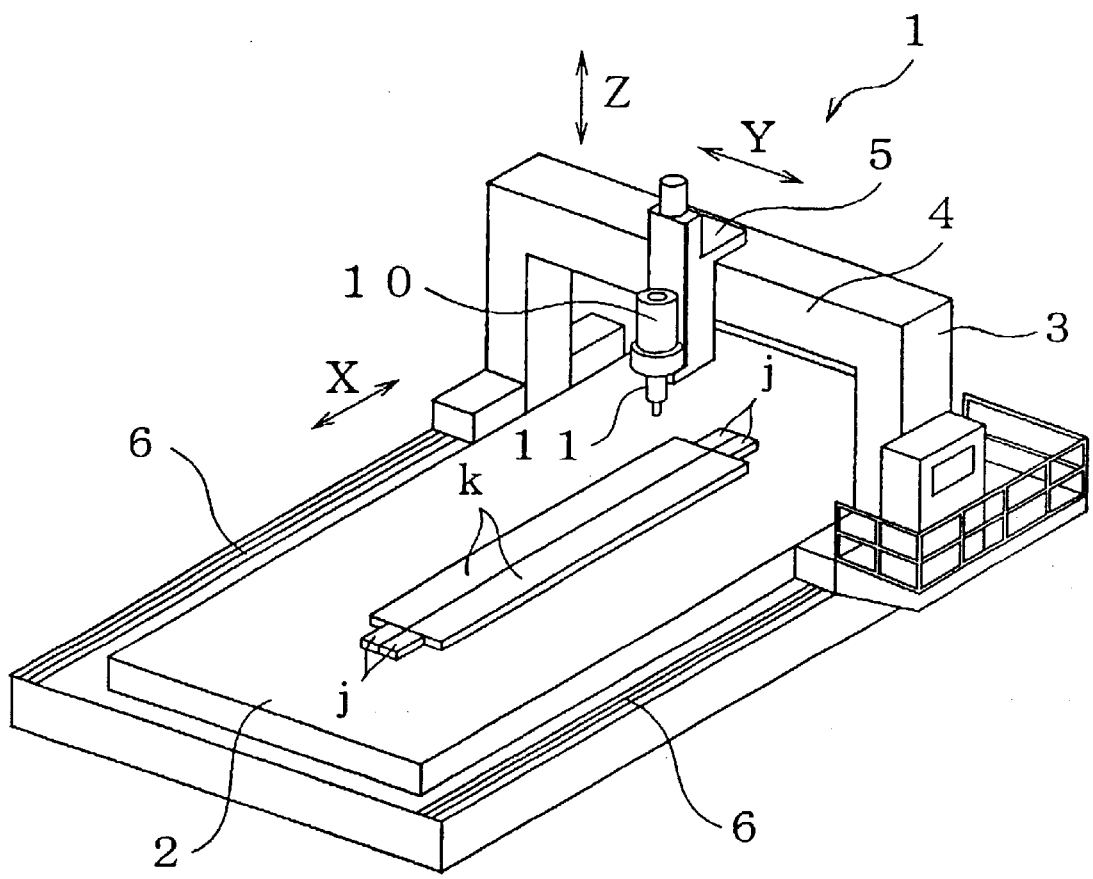
FIG. 1 is a perspective view schematically showing an operating state in which two work pieces are placed to be butted and welded by a friction stir welding method according to an embodiment of the present invention.
Figure 2:
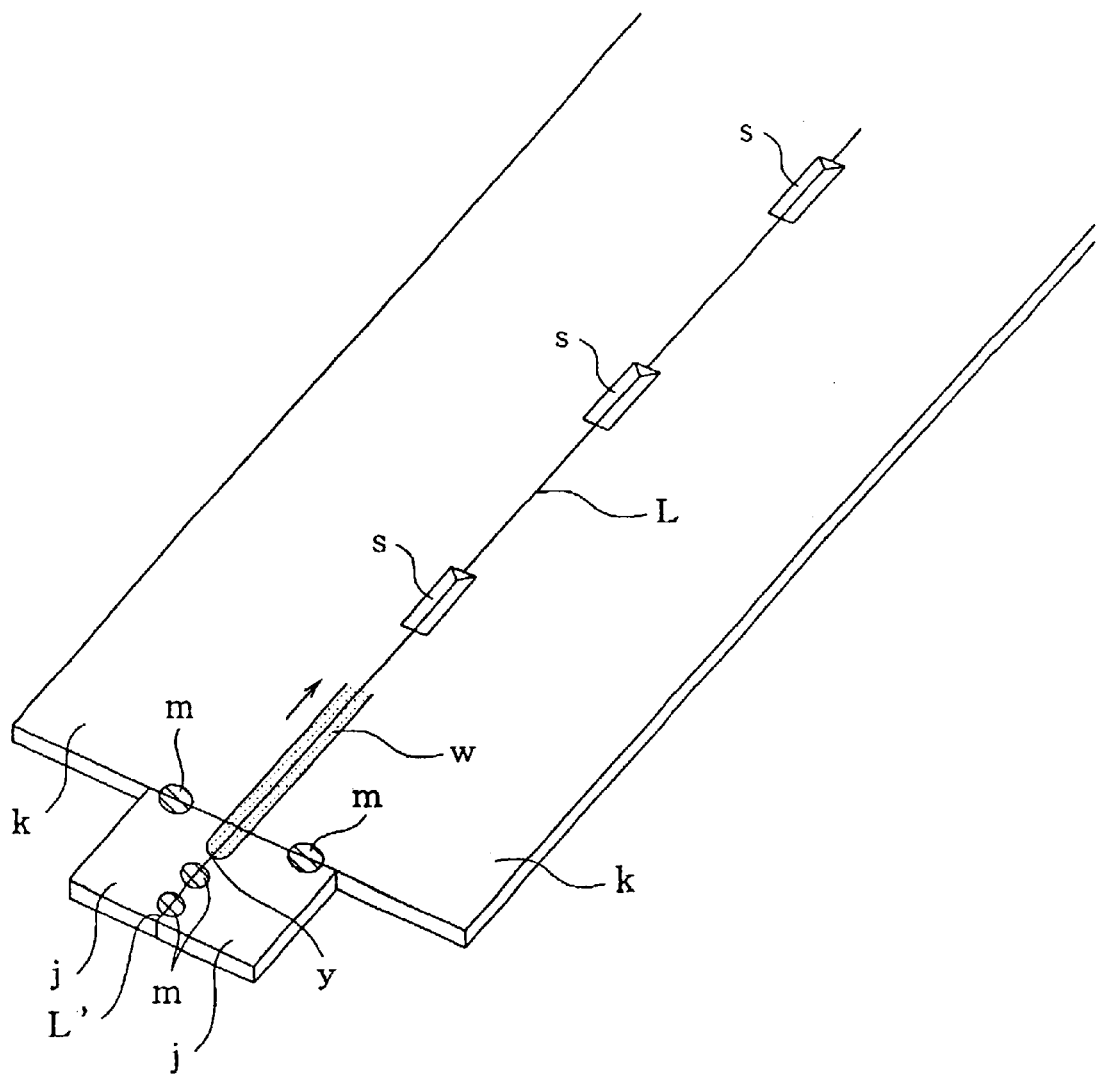
FIG. 2 is a partially enlarged perspective view showing a state in which the work pieces before tack welding in FIG. 1 are butted.
Figure 3A:
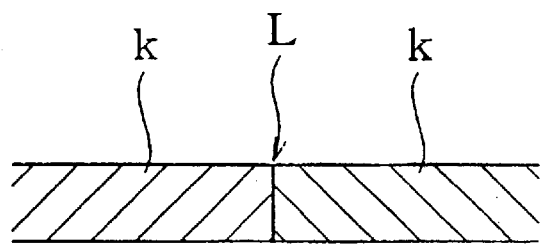
FIGS. 3A–3D are enlarged cross-sectional views taken along line C—C in FIG. 2, sequentially showing steps of friction stir welding of work pieces which are placed to be butted.
Figure 3B:
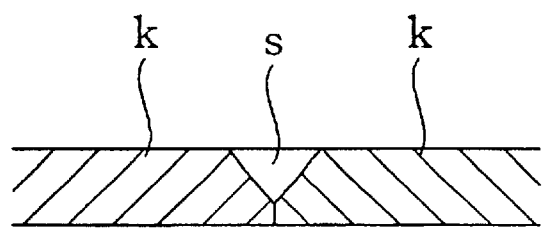
Figure 3C:
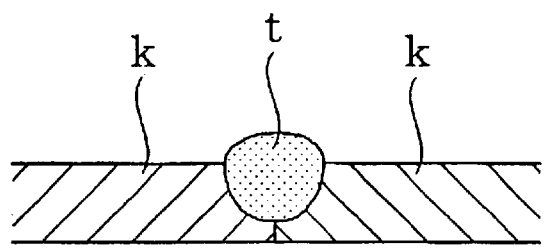
Figure 4:
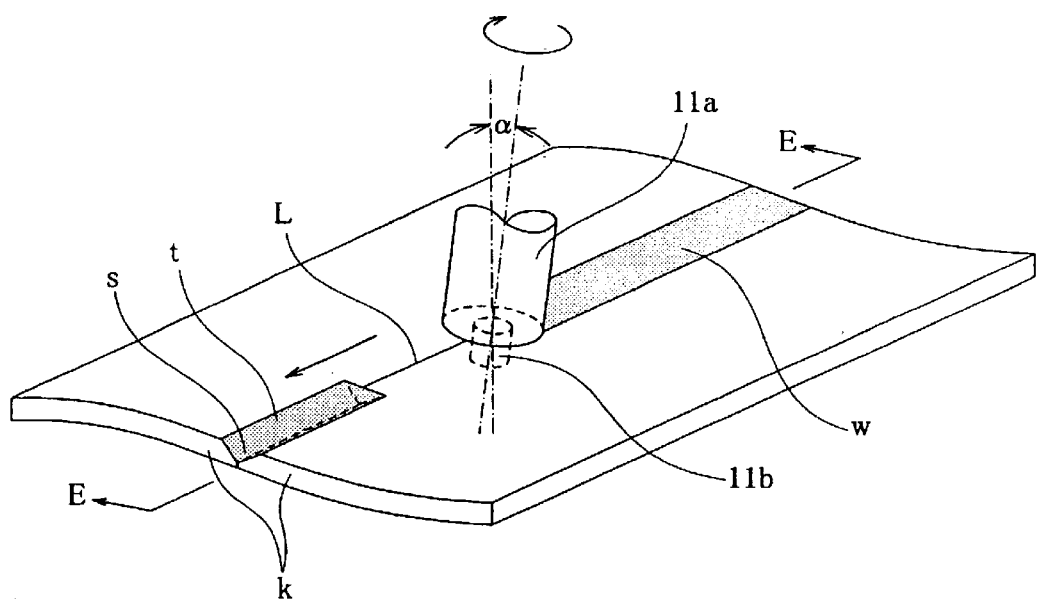
FIG. 4 is a perspective view showing enlarged part of the work pieces, being subjected to friction stir welding in the operating state in FIG. 1.
Figure 5:
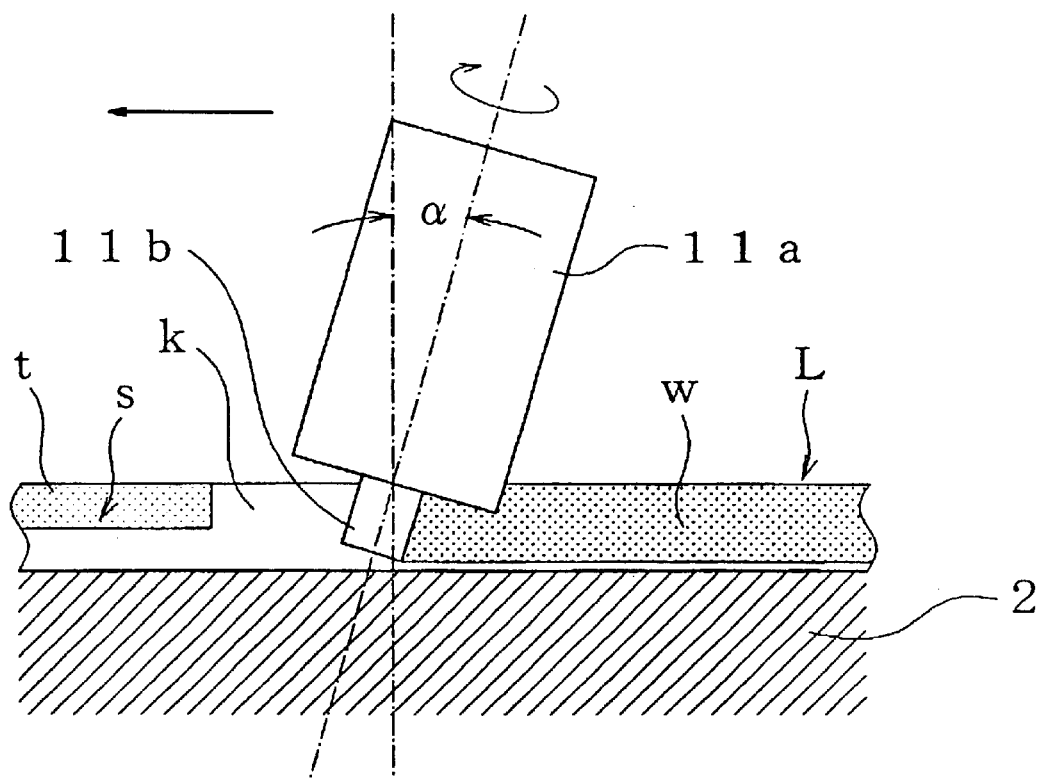
FIG. 5 is a cross-sectional view taken along line E—E in FIG. 4.

FIG. 1 is a perspective view schematically showing an operating state in which two work pieces are placed to be butted and welded by a friction stir welding method according to an embodiment of the present invention. FIG. 2 is a partially enlarged perspective view showing a state in which the work pieces before tack welding in FIG. 1 are butted. FIGS. 3A–3D are enlarged cross-sectional views taken along line C—C in FIG. 2, sequentially showing steps of friction stir welding of work pieces which are placed to be butted. FIG. 4 is a perspective view showing enlarged part of the work pieces being subjected to the friction stir welding in the operating state in FIG. 1. FIG. 5 is a cross-sectional view taken along line E—E in FIG. 4.

As shown in FIG. 1, a friction stir welding apparatus 1 according to an embodiment of the present invention comprises a flat bed 2 on which work pieces to be joined comprised of two extruded sections to be joined, i.e., work pieces k are placed, a gate-shaped frame 3 provided movably along a longitudinal direction of the bed 2, and a joint head 10 provided on a horizontal frame portion 4 of the gate-shaped frame 3 through a slider 5 such that the joint head 5 is movable in the lateral and vertical directions.

The joint head 10 contains a motor (not shown) in an upper portion thereof, and rotatably supports a rotating tool 11 at a lower end portion thereof. The rotating tool 11 is integrally rotatably connected to a lower end of a drive shaft of the motor. The rotating tool 11 is conical and tapered downwardly. As shown in FIGS. 4 and 5, the rotating tool 11 is configured such that a cylindrical shoulder portion 11a is integrally formed at a tip end portion of the rotating tool 11 and a pin 11b is protruded from a center portion of a tip end face of the shoulder portion 11a. The shoulder portion 11a and the pin 11b are made of metal harder and more rigid than a material of the work pieces k; for example, aluminum alloy, and their common center axis is inclined to an the opposite direction to the movement of the rotating tool 11 at an angle α (preferably about 3°) with respect to a vertical line.

The gate-shaped frame 3 is movable along a pair of rails 6 provided on both sides of the bed 2. The rotating tool 11 provided on the gate-shaped frame 3 is adapted to move along a butted portion L above a joining line of the butted portion L (see FIG. 2) of the two work pieces k.

The friction stir welding apparatus 1 according to this embodiment is constituted as described above and performs the friction stir welding as described below. First of all, the two work pieces k are placed on the bed 2 along the longitudinal direction and fixed by means of a jig (not shown) such that longitudinal sections of the work pieces k are butted with each other (see FIG. 3A).

Subsequently, as shown in FIG. 2, V-shaped grooves s each having a predetermined length (for example, approximately 30 mm) are formed in the fixed two work pieces k at predetermined intervals (for example, approximately 500 mm) along the butted portion L (see FIG. 3B). The grooves s are formed by using a dedicated tool (not shown) relatively easily and in a short time.

As shown in FIG. 2, on both longitudinal ends of the work pieces k, two pairs of small tab plates j are respectively tack-welded with deposits m. The tab plates j are also butted with each other and the corresponding butted portion L' is tack-welded by deposits m (see FIG. 2) at certain intervals (see FIG. 2). That is, the two tab plates j are tack-welded by using the I-shaped grooves.

Then, in this state, the V-shaped grooves s of the butted portion L in the work pieces k are tack-welded by using a welding material comprised of aluminum alloy similar to the material of the work pieces k, and by arc welding such as TIG welding or MIG welding. In this tack-welded state, the welding material in the V-shaped grooves is melted and part t' of solidified welded portion t is raised above the surface of the work pieces k and exposed (see FIG. 3C).

Figure 3D:
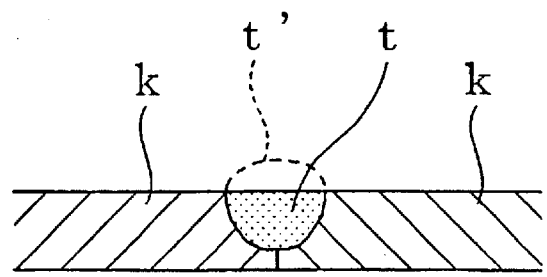

The welded portion t' exposed above the work pieces k from each of the V-shaped grooves s is cut and removed by using a cutting blade (not shown) and/or a grinder (not shown) to allow the surface of the butted portion L to be substantially coplanar over the entire length (see FIG. 3D).

Figure 3E:
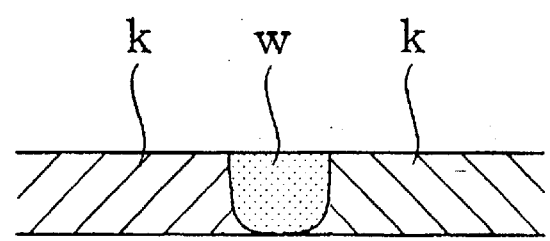

In this state, as shown in FIG. 2, starting from a point y in the butted portion L' of one of the two pairs of tab plates j, the rotating tool 11 is rotated and moved downwardly to be inserted to a predetermined depth. The gate-shaped frame 2 of the friction stir welding apparatus 1 is moved along the rails 6 to the butted portion L' of the other pair of tab plates j over the entire length of the butted portion L of the work pieces k while the rotating tool 11 is rotated and moved along the butted portion L. The rotation of the rotating tool 11 generates friction heat in the butted portion L of the work pieces k, and the butted portion L is thereby caused to flow plastically and be solid-phase welded. Therefore, the friction stir welding is performed over the entire length of the butted portion L including the tack-welded sections t (see FIG. 3E).

In FIGS. 2 and 3, w denotes a friction-stir-welded portion. In particular, since the welding material is aluminum alloy similar to the base metal of the work pieces k, the base metal of the work pieces k and the welding material are caused to flow substantially uniformly and plastically, and are caused to be solid-phase welded. Therefore, the high welding strength is obtained. Further, since the butted portion L of the work pieces k is caused to be substantially coplanar over the entire length, finish after the friction stir welding is almost accomplished only by removing the tab plates j from the work pieces k.

In the friction stir welding method of the present invention, alternatively, hollow extruded sections may be used as the work pieces k. As a matter of course, instead of the two work pieces, three or more work pieces may be butted and welded. In that case, a plurality of rotating tools 11 equal in number to the butted portions may be simultaneously used to perform friction stir welding of all the butted portions.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A method of friction stir welding of a plurality of work pieces, the method comprising the steps of:

placing the plurality of work pieces to be butted;

forming a plurality of V-shaped grooves intermittently along a butted portion of the plurality of work pieces;

performing tack welding of each of the V-shaped grooves by using a welding material;

cutting and removing deposits in tack-welded sections to be substantially coplanar with a surface of the work pieces; and performing friction stir welding of the butted portion continuously over an entire length thereof.

2. The method according to claim 1, wherein the tack welding is performed at intervals of approximately 400 mm to 700 mm.

3. The method according to claim 1, wherein the deposits in the tack-welded sections are cut and removed by using a grinding stone or a cutting blade.

4. The method according to claim 1, wherein the tack welding is performed by MIG welding or TIG welding, and metal having strength approximately as high as strength of base metal of the work pieces is used as the welding material.

* * * * *